(12) United States Patent
Shuf et al.

(10) Patent No.: US 8,122,219 B2
(45) Date of Patent: Feb. 21, 2012

(54) STORAGE ALLOCATION

(75) Inventors: Yefim Shuf, Millwood, NY (US); Hong Min, Poughkeepsie, NY (US); Hubertus Franke, Cortlandt Manor, NY (US); Ulrich Alfons Finkler, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 12/507,419

(22) Filed: Jul. 22, 2009

(65) Prior Publication Data

US 2011/0022815 A1 Jan. 27, 2011

(51) Int. Cl.
G06F 13/00 (2006.01)

(52) U.S. Cl. .......................... 711/171; 711/154

(58) Field of Classification Search .................. 711/154, 711/171

See application file for complete search history.

(56) References Cited

U.S. PATENT DOCUMENTS

| | | | |
|---|---|---|---|
| 5,732,402 A | 3/1998 | Lehman | |
| 5,802,599 A | 9/1998 | Cabrera et al. | |
| 7,093,096 B2 | 8/2006 | Fougeroux et al. | |
| 7,418,568 B2 * | 8/2008 | Maly | 711/171 |
| 2006/0080350 A1 | 4/2006 | Mark | |
| 2009/0003446 A1 * | 1/2009 | Wu et al. | 375/240.16 |

FOREIGN PATENT DOCUMENTS

| | | |
|---|---|---|
| CA | 2 281 287 | 3/2001 |
| DE | 19960114 | 6/2001 |
| EP | 694831 | 1/1996 |
| JP | 08249216 | 9/1996 |
| JP | 2004164370 | 6/2004 |
| WO | WO 2004063921 | 7/2004 |

* cited by examiner

*Primary Examiner* — Reba I. Elmore
(74) *Attorney, Agent, or Firm* — Ryan, Mason & Lewis, LLP

(57) ABSTRACT

Techniques for storage allocation of a data record are provided. The techniques include attempting to identify a first location for storing a data record, wherein the data record comprises one or more data record attributes, if the first location is identified, selecting the first location for storing the data record, and if the first location is not identified, identifying a second location for storing the data record using a cost penalty function and selecting the second location for storing the data record based on the cost penalty function.

25 Claims, 6 Drawing Sheets

STORAGE ALLOCATION

FIELD OF THE INVENTION

Embodiments of the invention generally relate to information technology, and, more particularly, to storage allocation.

BACKGROUND OF THE INVENTION

When a new record is to be inserted into a table in a database management system (DBMS), a storage manager must find a sufficiently large block of storage for this record. A storage manager has several contradictory goals: to allocate a block quickly, to place related data in some proximity, to avoid or minimize internal and external fragmentation.

To achieve a good speed of record allocation and a low internal fragmentation, some storage managers partition a new chunk of storage into equally sized blocks and use that region of storage only for the allocation of blocks of that particular size. The disadvantage of this approach is external fragmentation, and if the size of such a block is not popular, the remainder of the storage block will not be used.

To achieve a faster query time, some storage managers place related data on the same storage block. The disadvantage of this approach is that if there are not enough related records, some of the storage goes unused. To mitigate this, some storage allocators try to use the remaining storage for records that are not related. However, this will largely reduce the effectiveness and the original purpose of the scheme (that is, to try to provide with a quick access to related records) because the new related records will have to be placed elsewhere. Placing related records together is often called clustering.

Some database records may contain a portion which has a variable length. In addition, to reduce the amount of storage, users may want to compress the data of records. As a result, different records of a relational table (which normally all have the same size) may have a different size in a compressed form depending on the nature (compressibility) of data. Hence, related records may have different sizes and naive storage allocation methods that operate on fixed sized blocks are impractical.

Additionally, existing approaches include a one-dimensional view of available storage properties and/or attributes for search, that is, only one search property is considered such as either a size or a key value, but not both.

SUMMARY OF THE INVENTION

Principles and embodiments of the invention provide techniques for storage allocation. An exemplary method (which may be computer-implemented) for storage allocation of a data record, according to one aspect of the invention, can include steps of attempting to identify a first location for storing a data record, wherein the data record comprises one or more data record attributes, if the first location is identified, selecting the first location for storing the data record, and if the first location is not identified, identifying a second location for storing the data record using a cost penalty function and selecting the second location for storing the data record based on the cost penalty function.

One or more embodiments of the invention or elements thereof can be implemented in the form of a computer product including a tangible computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
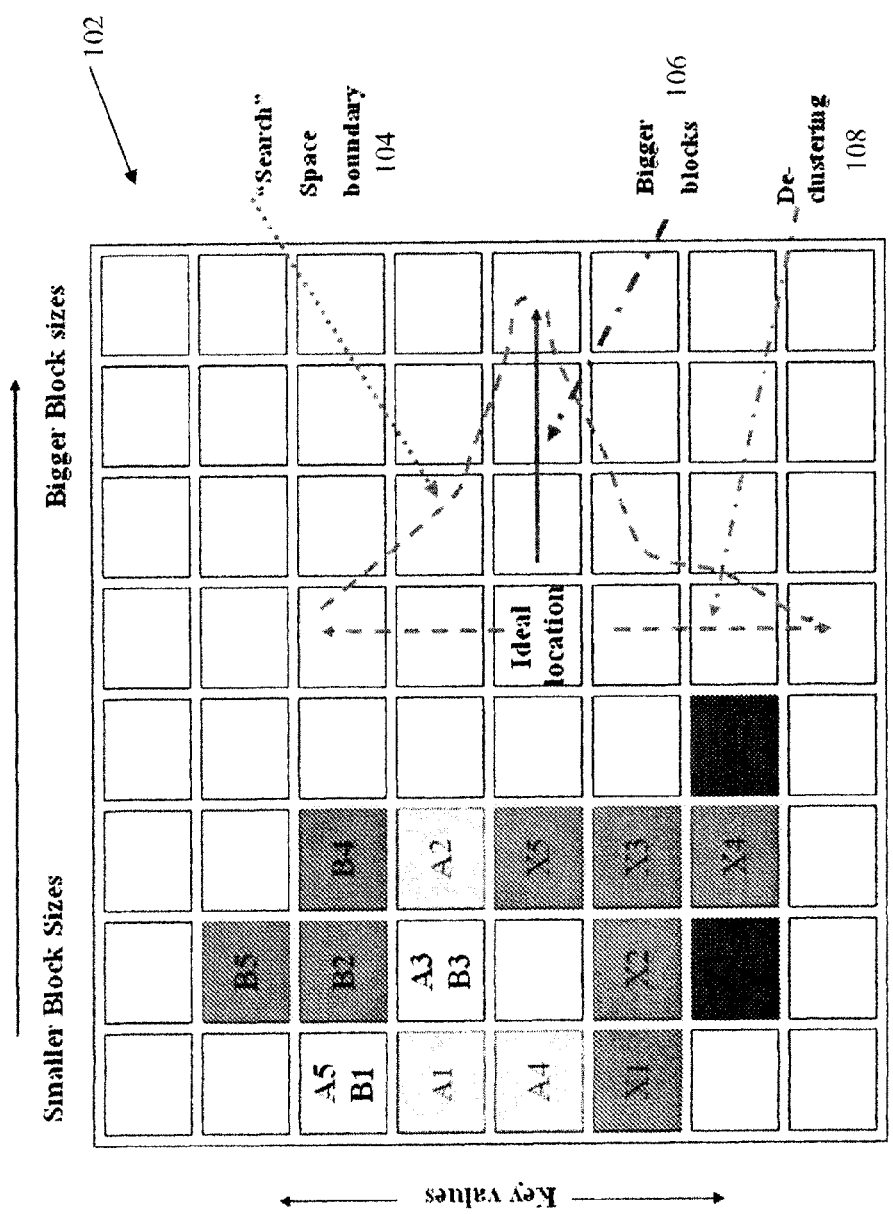
FIG. 1 is a diagram illustrating storage allocation, according to an embodiment of the present invention.

Principles of the invention include storage allocation for improving the placement of related data and reducing space fragmentation. Additionally, one or more embodiments of the invention include techniques that a database management system (DBMS) (or other storage management system) can use to allocate storage for a new record that needs to be inserted into a table.

As detailed herein, one or more embodiments of the invention include identifying an ideal location for at least one data record attribute, selecting an ideal location if such a location exists, else identifying an alternative location using a cost of penalty function, and selecting an alternative location for the data records attribute based on the cost penalty function. In contrast to the disadvantages of existing approaches, the techniques described herein allocate the storage based on both record key value and free block size in order to achieve better record clustering as well as lower space fragmentation.

Additionally, one or more embodiments of the invention maintain lists of free blocks for different combinations of block sizes and key values to find ideal location and alternatives. A penalty function is used to evaluate the impact of violating the clustering property, and a scope of search policy is used to guide free space search.

A record to be inserted (for example, into a table) has some "key" value and some "size." For a record, there is an ideal location defined by $L0=L(key, size)$. One or more embodiments of the invention try to allocate a record at that ideal location $L0$ first. If there is no space at location $L0$, instead of allocating a new storage block, the techniques described herein can proceed as follows.

A penalty function f (key, size) is defined whose value is associated with impact on clustering and space fragmentation when a record has to be placed at a location that is not the ideal, by deviating key value or increasing a block size when searching for available space. The value of the penalty function increases as the deviation of the key value increases or the increment of the block size increases.

For example, one or more embodiments of the invention attempt to place a new record next to less related records but still close enough. At the same time, one or more embodiments of the invention explore the possibility of placing a new record into a bigger memory block (some fragmentation) while still maintaining the property of "related records are together." When both choices have free space available for record placement, the decision is made based on comparing the values of penalty function for each choice.

The techniques described herein also define a search limit with the constraint $f(key,size) < M_{limit}$, where $M_{limit}$ is the maximum penalty one is willing to incur when allocating a record at a not ideal location. One or more embodiments of the invention start at location L0=L(key, size). Then, one can measure the penalty of placing a new record at L (Key+ delta_key, size+delta_size), where delta_key is a small deviation from original key value, and delta_size is an increment in a block size. As such, the best location with the smallest penalty is selected. Also, if too many locations are tried without meeting $M_{limit}$ constraints, one can allocate a new storage block (extend).

As detailed herein, one or more embodiments of the invention provide a balanced approach that allocates storage within certain time constraints, allocates related records relatively close to each other, and keeps storage fragmentation within bounds.

Additionally, one or more embodiments of the invention include data structures. The data structures maintain lists of free blocks for the different combination of block size and key values or key value ranges. The key value ranges can be coarse-grained or fine-grained. Also, the data structures can denote the lists of free blocks, for example, as L(key_i, blockSize_j), i=1 . . . n, j=1 . . . m.

Further, the data structures define a cost-penalty function "f" that factors in parameters such as reduced data clustering and the impact on space fragmentation. f(key,size)=0 when a space is found in the space list that matches both intended inserting key and block size. The value of "f" increases when either the difference of the key (compare to intended inserting key) or difference of block size (compare to intended inserting block size) increases.

The data structures can also define a search constrain $M_{limit}$, as well as define a collection C containing pairs of an available search list and the cost value computed from penalty function "f," and initialize collection C to null.

In one or more embodiments of the invention, a flow of searching free blocks for inserting k0=key and s0=size can proceed as follows.
0. Store {L(k0,s0). f=0} in collection C.
1. Start search and find a free block from the list of L in C:
   1a) If found, return to caller with the location found.
   1b) If not found, remove {L(k0,s0). f=0} from C, let k=k0, s=s0 and go to step 2.
2. With k_new1="left neighboring key from k," compute f(k_new1,s); With k_new2="right neighboring key from k," compute f(k_new2,s) (if the key and blockSize combination has not been checked in previous iteration).
   2a) If $f(k\_new1,s) > M_{limit}$ and $f(k\_new2,s) > M_{limit}$, go to step 3.
   2b) Else: store {L(k_new1,s) and f(k_new1,s)} to C if $f(k\_new1,s) \leq M_{limit}$; and store {L(k_new2,s) and f(k_new2, s)} to C if $f(k\_new2,s) \leq M_{limit}$, and go to step 4.
3. With s_new=next block larger than s, compute f(k, s_new) (if the key and blockSize combination has not been checked in previous iteration).
   3a) If F=f(k,s_new)>Mlimit, go to step 5.
   3b) Else: add L(k_new,s) and f(k_new,s) to C, go to step 4. (In one or more embodiments of the invention, one can limit the search by only storing the smaller f in C between step 2b and step 3b).
4. If there is enough iteration done already, go to 5. Otherwise, iterate through the next elements in C L(k',s') and by letting k=k', s=s' and going to step 2.
5. If C is empty, go to step 6; else go to step 7.
6. Allocate space in extent. Return to caller with the new extended location
7. Return to caller with the location in C whose penalty function f is the smallest.

FIG. 1 is a diagram illustrating storage allocation 102, according to an embodiment of the present invention. By way of illustration, FIG. 1 depicts a "search" space boundary 104, bigger blocks 106 and de-clustering 108.

FIG. 1 illustrates how the storage is allocated. Each "box" represents a block of storage for one or more data records. The labels (for example, A1) represent key value (A) and a sequence of such keys (1). As detailed herein, the ideal location is chosen as a function of the key value of a record for which storage needs to be allocated and the size of such record. The shading of the boxes represents blocks of storage where only records of related key values are stored. The un-shaded boxes with labels represent blocks of storage where records of unrelated key values are stored.

The Y axis of the diagram shows that different keys values are represented across that axis and can optionally be ordered in ascending or descending order. The X axis represents the sizes of storage blocks that range from small to big. When a new block is allocated, one or more embodiments of the invention attempt to pick an "ideal location" as shown in FIG. 1. If there is no room there, one or more embodiments of the invention attempt the locations outlined by the dashed lines representing a search space boundary 104 which deviates along the Y axis (shown as de-clustering 108) and also stretches into bigger block sizes (for example, as shown by label 108).

Figure 2:
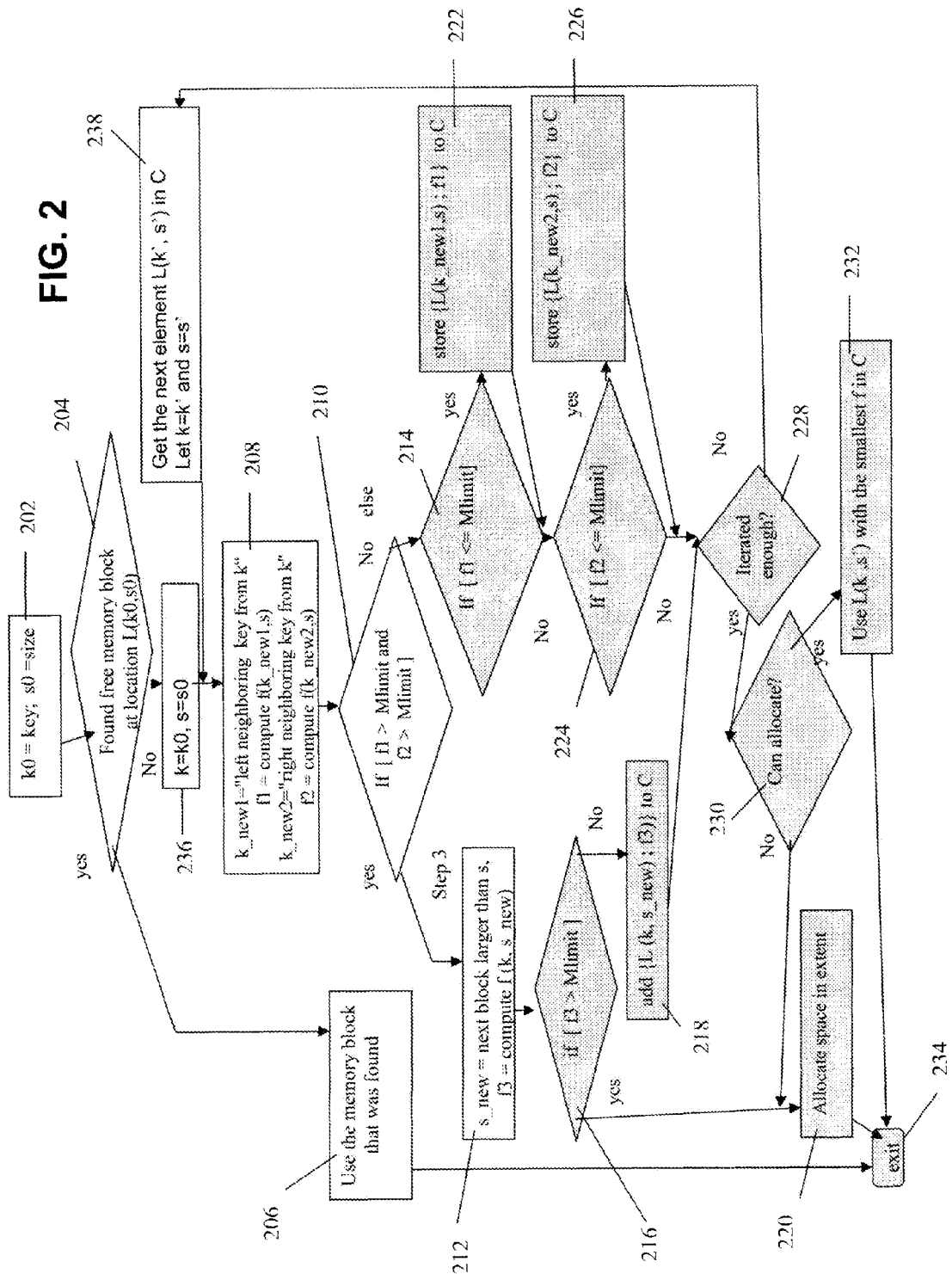
FIG. 2 is a flow diagram illustrating techniques for storage allocation, according to an embodiment of the present invention.

FIG. 2 is a flow diagram illustrating techniques for storage allocation, according to an embodiment of the present invention. By way of illustration, FIG. 2 depicts starting at step 202 (noting that k0=key and s0=size). Step 204 includes determining whether a free memory block was found at location L(k0,s0). If the response to the query in step 204 is "yes," one proceeds to step 206 to use the memory block found in step 204, and ultimately proceeds to exiting the techniques in step 234. If the response to the query in step 204 is "no," one proceeds to step 236 (k=k0 and s=0) and then to step 208 and computes f1 (that is, f(k_new1,s)) (considering, for example, k_new1="left neighboring key from k") and f2 (that is, f(k_new2,s)) (considering, for example, k_new2="right neighboring key from k").

Step 210 includes determining if $f1 > M_{limit}$ and $f2 > M_{limit}$. If the response to the query in step 210 is "yes," one proceeds to step 212 to determine f3 (that is, f(k, s_new) (considering, for example, s_new=next block larger than s). If the response to the query in step 210 is "no," one proceeds to step 214 to determine is $f1 \leq M_{limit}$. If the response to the query in step 214 is "yes," one proceeds to step 222 and stores {L(k_new1, s); f1} to C. If the response to the query in step 214 is "no," one proceeds to step 224 and determines whether f2≤$M_{limit}$. If the response to the query in step 224 is "yes," one proceeds to step 226 and stores {L(k_new2,s); f2} to C. If the response to the query in step 224 is "no," one proceeds to step 228 to determine if enough iterations have been performed. If the response to the query in step 228 is "no," one proceeds to step 238 and gets the next element L(k', s') in C, and lets k=k' and s=s'. If the response to the query in step 228 is "yes," one proceeds to step 230 to determine if allocation can be performed. If the response to the query in step 230 is "no," one proceeds to step 220 to allocate space in extend. If the response to the query in step 230 is "yes," one proceeds to step 232 to use L(k,s) with the smallest f in C.

Additionally, step 216 includes determining if f3>$M_{limit}$. If the response to the query in step 216 is "yes," one proceeds to step 220. If the response to the query in step 216 is "no," one proceeds to step 218 and adds {L(k,s_new); f3} to C and then proceeds to step 228.

Figure 3:
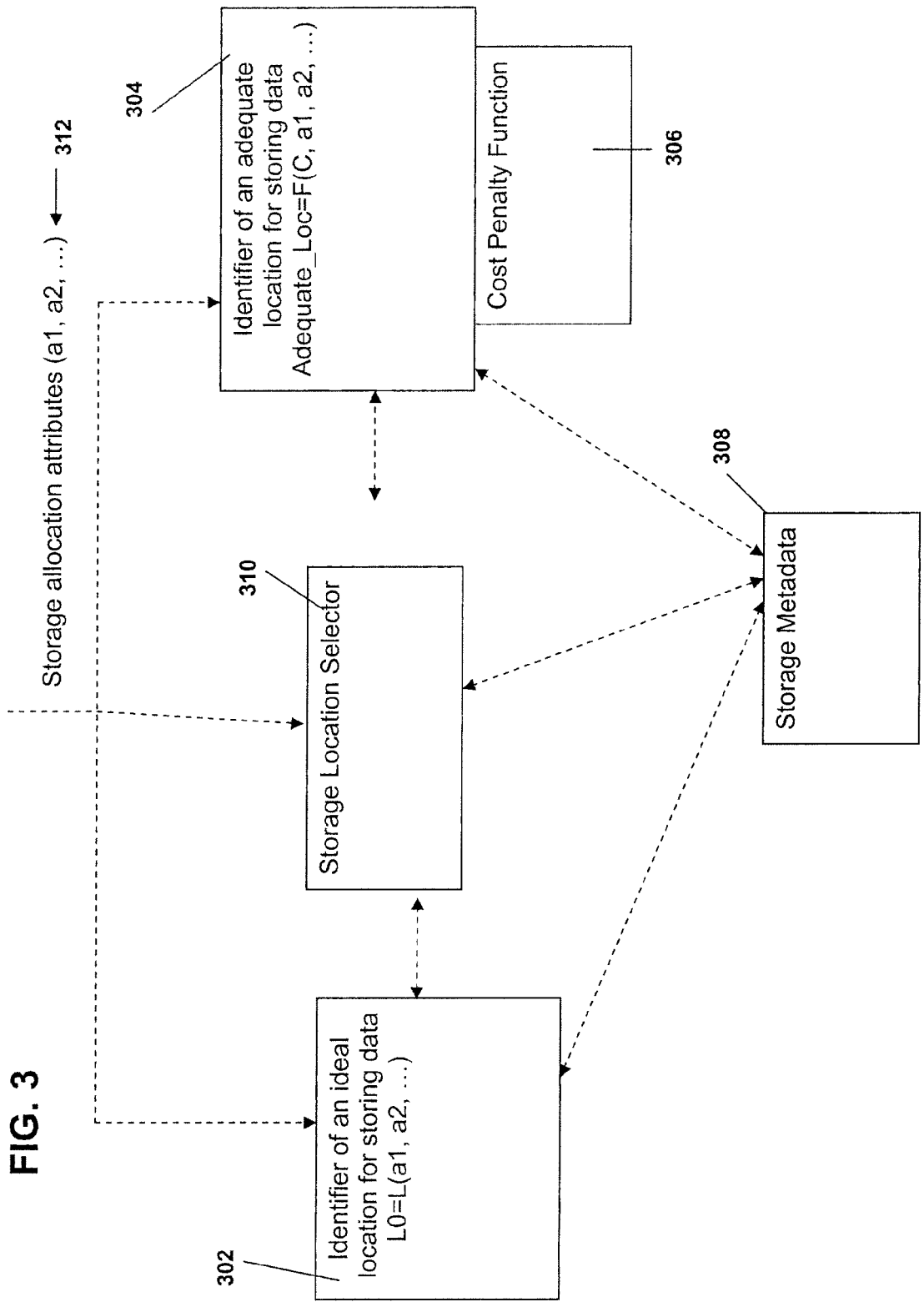
FIG. 3 is a block diagram illustrating an exemplary embodiment, according to an aspect of the invention.

FIG. 3 is a block diagram illustrating an exemplary embodiment, according to an aspect of the invention. FIG. 3 depicts a record 312 with storage allocation attributes (for example, a1, a2, etc.), an ideal location identifier module 302 (for storing data (for example, L0=L(a1, a2, ...)), a storage location selector module 310, an adequate location identifier module 304 (for storing data (for example, Adequate_Loc=F (C, a1, a2, ...), a cost penalty function module 306 and a storage metadata module 308.

As depicted in FIG. 3, the block of storage that is allocated depends on the storage attributes of a record 312. One attribute can be a record key. Another attribute can be a record size. In one or more embodiments of the invention, there can be more attributes such as, for example, access pattern to a record.

The ideal location is identified by the identifier of an ideal location for storing data 302 which uses storage allocation attributes 312 and consults storage metadata 308 to find an empty block corresponding to storage attributes 312.

One or more alternate locations are identified by the identifier of an adequate location for storing data 304, which uses storage allocation attributes 312 and consults storage metadata 308 to find an empty block corresponding to storage attributes 312. The identifier of an adequate location for storing data 304 uses a cost penalty function via the cost penalty function module 306 to determine the penalty of allocating a record at a non-ideal location.

The storage location selector module 310 selects a location to be used for storing a record either based on the location identified by the identifier of an ideal location for storing data 302 or, if no ideal location is found, then based on the location identified by the identifier of an adequate location for storing data 304. The storage location selector module 310 denotes in the storage metadata module 308 which storage location it selects for storing a record.

Figure 4:
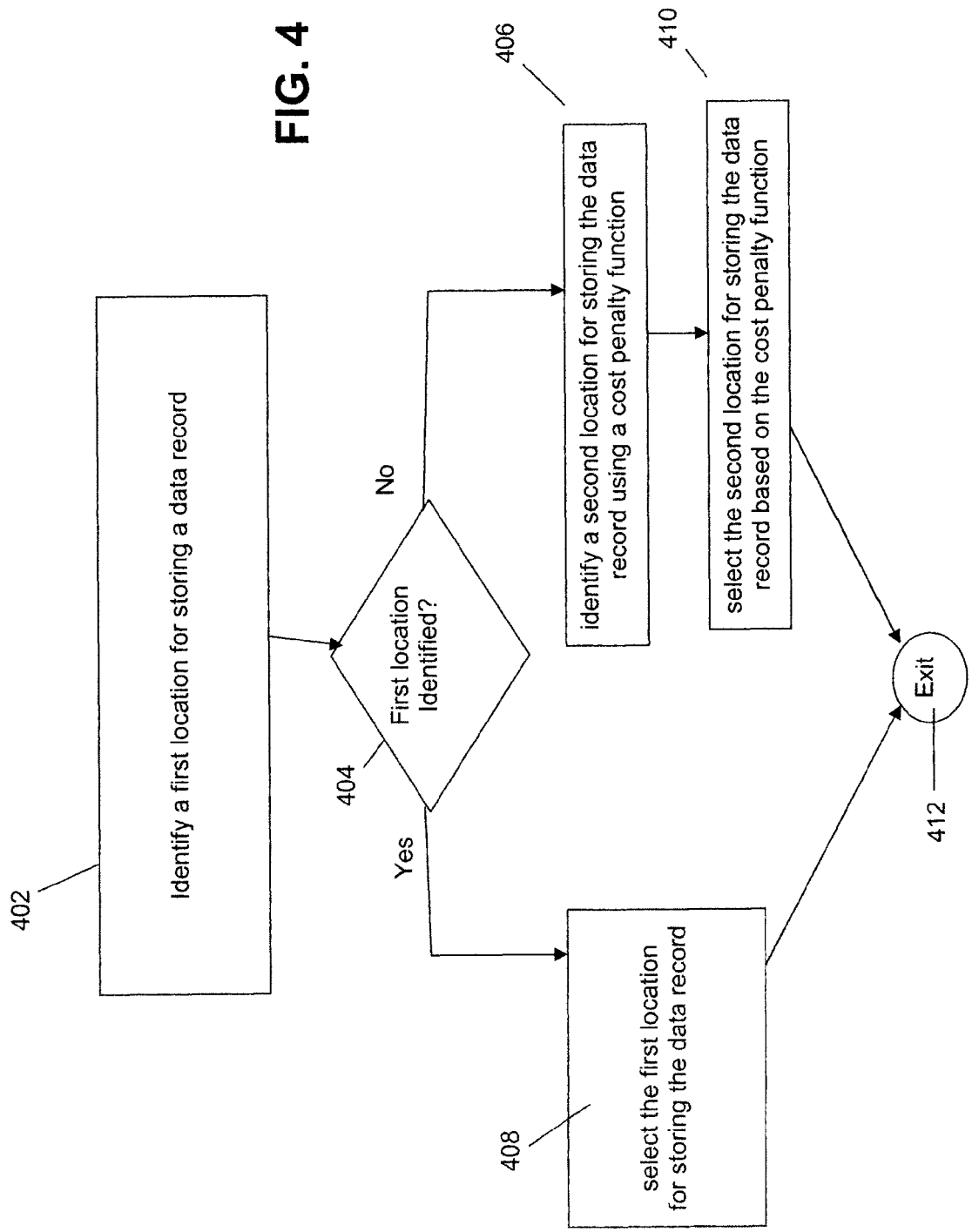
FIG. 4 is a flow diagram illustrating techniques for storage allocation of a data record, according to an embodiment of the invention.

FIG. 4 is a flow diagram illustrating techniques for storage allocation of a data record, according to an embodiment of the invention. Step 402 includes identifying a first location for storing a data record. In step 404, a determination is made whether or not such a first location has been identified. If the first location has been identified, one can proceed to step 408 and select the first location for storing the data record. If a first location has not been identified, one proceeds to step 406 to identify a second location for storing the data record using a cost penalty function. Then, step 410 includes selecting the second location for storing the data record based on the cost penalty function. After either step 408 or step 410, one can exit via step 412.

Figure 5:
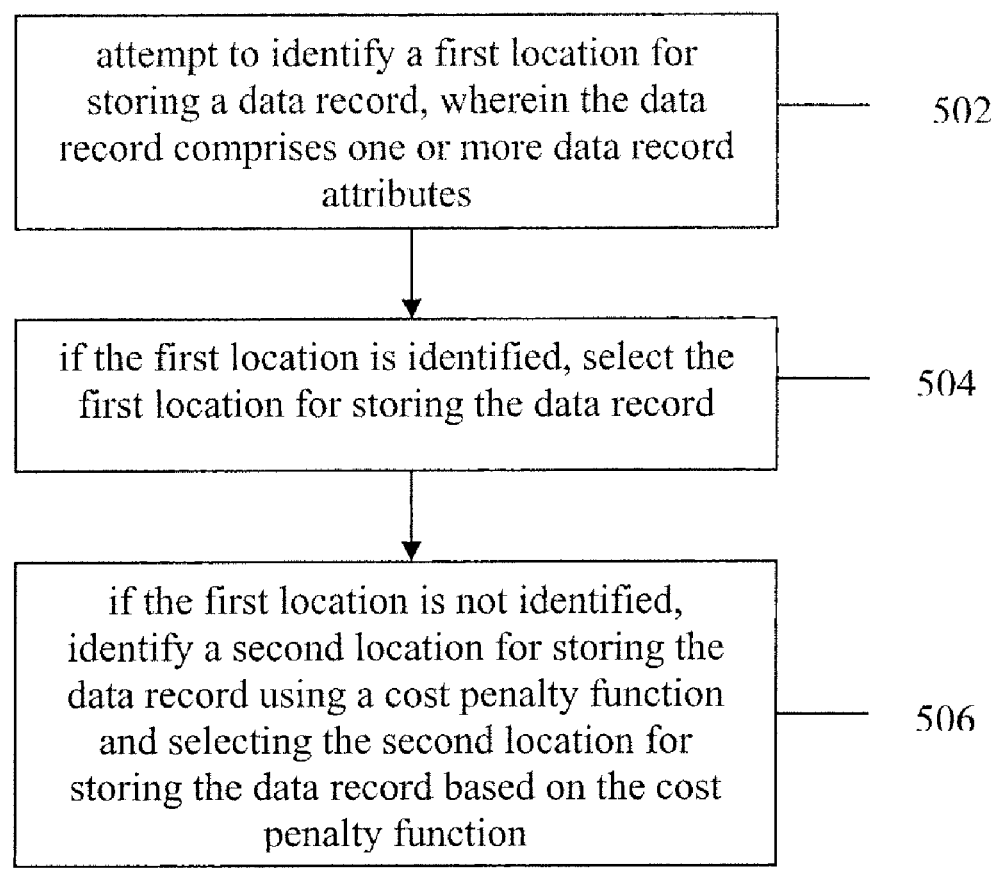
FIG. 5 is a flow diagram illustrating techniques for storage allocation of a data record, according to an embodiment of the invention.

FIG. 5 is a flow diagram illustrating techniques for storage allocation of a data record, according to an embodiment of the present invention. Step 502 includes attempting to identify a first location (for example, an ideal location) for storing a data record, wherein the data record comprises one or more data record attributes (such as, for example, data record key and data record size). For example, storage metadata (for example, component 308 in FIG. 3) maintains a list of free blocks, and the list can include one or more combinations of block sizes and key values. As such, identifying a first location can include determining if the list of free blocks contains an empty block for a particular block size and key value.

Step 504 includes if the first location is identified, selecting the first location for storing the data record. Step 506 includes if the first location is not identified, identifying a second location for storing the data record using a cost penalty function and selecting the second location for storing the data record based on the cost penalty function. Identifying the second location for storing the data record can include identifying a location having key values proximate to a key value of the data record, as well as identifying a location having one or more data blocks capable of accommodating the data record. Also, selecting the second location for storing the data record can include selecting the location to achieve a more efficient record clustering as well as a lower space fragmentation.

Additionally, the techniques depicted in FIG. 5 can include maintaining a list of one or more free blocks, wherein the list of free blocks includes one or more combinations of block sizes and key values.

One or more embodiments of the invention can also incorporate a statistical biasing based on assumptions on block distributions or on the history of block operations encountered so far (that is, observations). For example, if blocks within a certain key cluster are much more prevalent and/or correlate with certain key sizes, then one or more embodiments of the invention can adapt the free block organization to answer requests for those kinds of blocks faster.

The techniques depicted in FIG. 5 can also, as described herein, provide a system (and be run on a system), wherein the system includes distinct software modules, each of the distinct software modules being embodied on a tangible computer-readable recordable storage medium. The distinct software modules can include, for example, an ideal location identifier module, a storage location selector module, an adequate location identifier module and a cost penalty function module executing on a hardware processor. For example, one or more embodiments of the invention can also include a storage metadata module, which could reside on a storage system and be called via an application programming interface.

Additionally, the techniques depicted in FIG. 5 can be implemented via a computer program product that can include computer usable program code that is stored in a computer readable storage medium in a data processing system, and wherein the computer usable program code was downloaded over a network from a remote data processing system. Also, in one or more embodiments of the invention, the computer program product can include computer usable program code that is stored in a computer readable storage medium in a server data processing system, and wherein the computer usable program code are downloaded over a network to a remote data processing system for use in a computer readable storage medium with the remote system.

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 6:
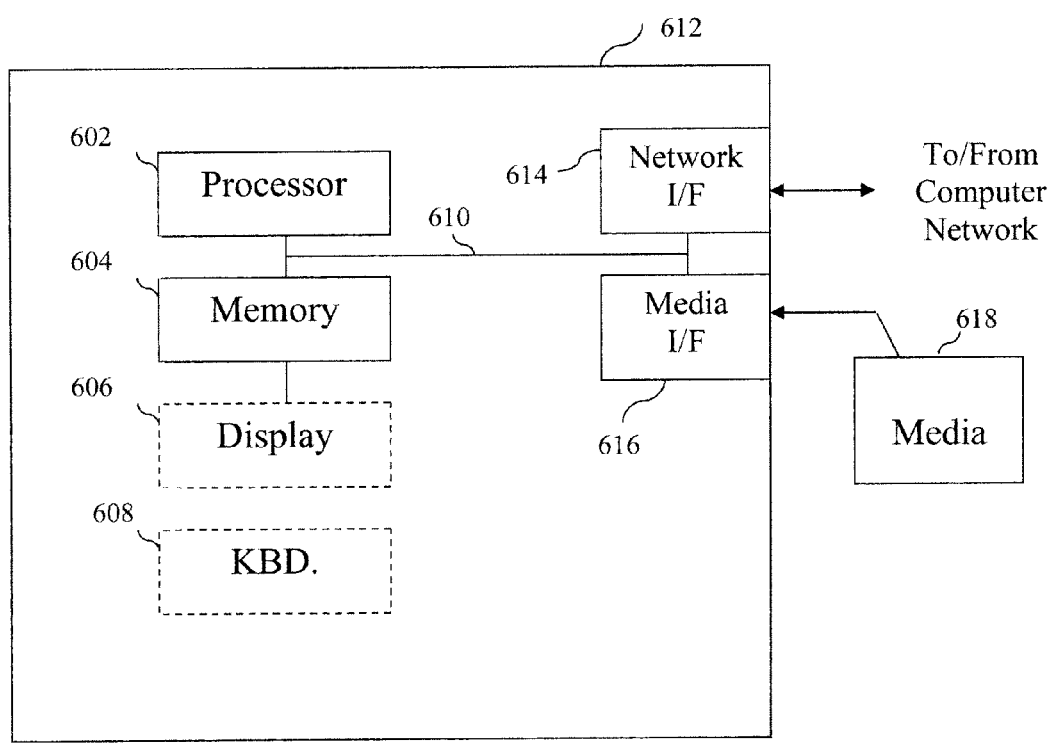
FIG. 6 is a system diagram of an exemplary computer system on which at least one embodiment of the invention can be implemented.

One or more embodiments can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 618) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a tangible computer-readable storage medium include a semiconductor or solid-state memory (for example memory 604), magnetic tape, a removable computer diskette (for example media 618), a random access memory (RAM), a read-only memory (ROM), a rigid magnetic disk and an optical disk (but exclude a propagation medium). Current examples of optical disks include compact disk-read only memory (CD-ROM), compact disk-read/write (CD-R/W) and DVD.

A data processing system suitable for storing and/or executing program code will include at least one processor 602 coupled directly or indirectly to memory elements 604 through a system bus 610. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). One or more embodiments of the invention can also be implemented (partly or entirely) on a storage server.

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable storage medium; the modules can include any or all of the components shown in FIG. 3. The method steps can then be carried out using the distinct software modules and/or sub-modules of the system, as described above, executing on a hardware processor. Further, a computer program product can include a tangible computer-readable storage medium with code adapted to be executed to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, allocating storage based on both record key value and free block size in order to achieve better record clustering as well as lower space fragmentation.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for storage allocation of a data record, wherein the method comprises:
   attempting to identify a first location for storing a data record, wherein the data record comprises one or more data record attributes;
   if the first location is identified, selecting the first location for storing the data record; and
   if the first location is not identified, identifying a second location for storing the data record using a cost penalty function and selecting the second location for storing the data record based on the cost penalty function.

2. The method of claim 1, wherein selecting the second location for storing the data record based on the cost penalty function comprises selecting the second location for storing the data record to achieve a more efficient record clustering.

3. The method of claim 1, wherein selecting the second location for storing the data record based on the cost penalty function comprises selecting the second location for storing the data record to achieve a lower space fragmentation.

4. The method of claim 1, wherein the one or more data record attributes comprise data record key.

5. The method of claim 1, wherein the one or more data record attributes comprise data record size.

6. The method of claim 1, wherein identifying a second location for storing the data record comprises identifying a location having key values proximate to a key value of the data record.

7. The method of claim 1, wherein identifying a second location for storing the data record comprises identifying a location having one or more data blocks capable of accommodating the data record.

8. The method of claim 1, further comprising maintaining a list of one or more free blocks.

9. The method of claim 8, wherein the list of one or more free blocks comprises one or more combinations of block sizes and key values.

10. The method of claim 1, further comprising providing a system, wherein the system comprises one or more distinct software modules, each of the one or more distinct software modules being embodied on a tangible computer-readable recordable storage medium, and wherein the one or more distinct software modules comprise an ideal location identifier module, a storage location selector module, an adequate location identifier module and a cost penalty function module executing on a hardware processor.

11. A computer program product comprising a tangible computer readable recordable storage medium including computer usable program code for storage allocation of a data record, the computer program product including:
   computer usable program code for attempting to identify a first location for storing a data record, wherein the data record comprises one or more data record attributes;
   computer usable program code for selecting the first location for storing the data record if the first location is identified; and
   computer usable program code for identifying a second location for storing the data record using a cost penalty function if the first location is not identified, and selecting the second location for storing the data record based on the cost penalty function.

12. The computer program product of claim 11, wherein the one or more data record attributes comprise data record key.

13. The computer program product of claim 11, wherein the one or more data record attributes comprise data record size.

14. The computer program product of claim 11, wherein the computer usable program code for identifying a second location for storing the data record comprises computer usable program code for identifying a location having key values proximate to a key value of the data record.

15. The computer program product of claim 11, wherein the computer usable program code for identifying a second location for storing the data record comprises computer usable program code for identifying a location having one or more data blocks capable of accommodating the data record.

16. The computer program product of claim 11, further comprising computer usable program code for maintaining a list of one or more free blocks, wherein the list of one or more free blocks comprises one or more combinations of block sizes and key values.

17. The computer program product of claim 11, wherein the computer usable program code comprises one or more distinct software modules, and wherein the one or more distinct software modules comprise an ideal location identifier module, a storage location selector module, an adequate location identifier module and a cost penalty function module executing on a hardware processor.

18. A system for storage allocation of a data record, comprising:
   a memory; and
   at least one processor coupled to the memory and operative to:
      attempt to identify a first location for storing a data record, wherein the data record comprises one or more data record attributes;
      if the first location is identified, select the first location for storing the data record; and
      if the first location is not identified, identify a second location for storing the data record using a cost penalty function and select the second location for storing the data record based on the cost penalty function.

19. The system of claim 18, wherein the one or more data record attributes comprise data record key.

20. The system of claim 18, wherein the one or more data record attributes comprise data record size.

21. The system of claim 18, wherein the at least one processor coupled to the memory operative to identify a second location for storing the data record is further operative to identify a location having key values proximate to a key value of the data record.

22. The system of claim 18, wherein the at least one processor coupled to the memory operative to identify a second location for storing the data record is further operative to identify a location having one or more data blocks capable of accommodating the data record.

23. The system of claim 18, wherein the at least one processor coupled to the memory is further operative to maintain a list of one or more free blocks, wherein the list of one or more free blocks comprises one or more combinations of block sizes and key values.

24. The system of claim 18, further comprising a tangible computer-readable recordable storage medium having one or more distinct software modules embodied thereon, the one or more distinct software modules comprising an ideal location identifier module, a storage location selector module, an adequate location identifier module and a cost penalty function module executing on a hardware processor.

25. An apparatus for storage allocation of a data record, the apparatus comprising:
   means for attempting to identify a first location for storing a data record, wherein the data record comprises one or more data record attributes;
   means for if the first location is identified, selecting the first location for storing the data record; and
   means for if the first location is not identified, identifying a second location for storing the data record using a cost penalty function and selecting the second location for storing the data record based on the cost penalty function.

* * * * *